(12) United States Patent
Madjitey, Jr.

(10) Patent No.: US 11,985,119 B2
(45) Date of Patent: May 14, 2024

(54) SYSTEMS AND METHODS FOR REQUESTING UNMANNED AERIAL VEHICLE-BASED SURVEILLANCE SERVICES

(71) Applicant: GEM Industrial Solutions Ltd., Accra (GH)

(72) Inventor: George Eric Madjitey, Jr., Sugar Land, TX (US)

(73) Assignee: GEM Industrial Solutions Ltd., Accra (GH)

( * ) Notice: Subject to any disclaimer, the term of this patent is extended or adjusted under 35 U.S.C. 154(b) by 0 days.

(21) Appl. No.: 17/533,999

(22) Filed: Nov. 23, 2021

(65) Prior Publication Data

US 2022/0166766 A1 May 26, 2022

Related U.S. Application Data

(60) Provisional application No. 63/117,427, filed on Nov. 23, 2020.

(51) Int. Cl.
*H04L 29/00* (2006.01)
*H04L 9/40* (2022.01)
(Continued)

(52) U.S. Cl.
CPC .......... *H04L 63/0838* (2013.01); *H04W 4/14* (2013.01); *H04W 12/062* (2021.01); *H04W 12/086* (2021.01)

(58) Field of Classification Search
CPC ............ H04L 63/0838; H04W 12/062; H04W 12/086; H04W 4/14
(Continued)

(56) References Cited

U.S. PATENT DOCUMENTS 10,395,543 B2   8/2019   Chambers et al.
11,066,164 B1 *  7/2021   Tsong ................... H04L 9/3263
(Continued)

OTHER PUBLICATIONS

International Search Report and Written Opinion dated Feb. 18, 2022, directed to PCT Application No. PCT/US21/72575; 8 pages.

*Primary Examiner* — Jeffrey C Pwu
*Assistant Examiner* — Michael D Anderson
(74) *Attorney, Agent, or Firm* — MORRISON & FOERSTER LLP

(57) ABSTRACT

A method includes receiving from a user an SMS message request for a UAV-based agricultural service; in response to receiving the SMS message request, transmitting to the user one or more prompts with predefined response options; generating a UAV-based agricultural service work request based on responses from the user to the prompts that comprise selections of predefined responses; transmitting automated voice calls to a plurality of UAV operators requesting acceptance of the UAV-based agricultural service work request; in response to receiving an acceptance from an accepting UAV operator during a voice call, transmitting a one-time password to the accepting UAV operator; receiving an access request from the accepting UAV operator comprising the one-time password; and in accordance with a successful authentication based on the one-time password, associating the UAV-based agricultural service work request with the pre-establish account associated with the accepting UAV operator.

18 Claims, 16 Drawing Sheets

(51) Int. Cl.
*H04W 4/14* (2009.01)
*H04W 12/062* (2021.01)
*H04W 12/086* (2021.01)

(58) Field of Classification Search
USPC .......................................................... 726/6
See application file for complete search history.

(56) References Cited

U.S. PATENT DOCUMENTS

2017/0154339 A1* 6/2017 Kimberlin .............. G09B 19/00
2018/0012229 A1 1/2018 Roberts et al.
2020/0151798 A1 5/2020 Sim et al.

* cited by examiner

SYSTEMS AND METHODS FOR REQUESTING UNMANNED AERIAL VEHICLE-BASED SURVEILLANCE SERVICES

CROSS-REFERENCE TO RELATED APPLICATIONS

This application claims the priority of U.S. Provisional Application No. 63/117,427, filed Nov. 23, 2020, the entire contents of which is incorporated herein by reference.

FIELD

This disclosure is related generally to unmanned aerial vehicle services and, more particularly, to facilitating requests for unmanned aerial vehicle services.

BACKGROUND

Aerial surveillance can be useful for agricultural operations. For example, aerial imaging can be used for generating: orthomosaic mapping for assessing land use, dense terrain and elevation models for planting irrigation networks, normalized difference vegetation index (NDVI) reports to identify crop stress crop head counting for yield estimation, and generating detailed topographic model for project development. With recent advances in unmanned aerial vehicle (UAV) (also referred to as drone) technology and reduction in UAV costs, UAVs are often used for performing aerial surveillance. Many industrial agriculture operations maintain one or more UAV's for this purpose. Alternatively, UAV surveillance can be provided by third-parties.

In areas with well-developed communications and computing infrastructure, third-party UAV surveillance services can often be requested through a smartphone app or web-based portal. However, many agricultural areas lack access to a high-speed network or the smartphones or other computing systems that can access the high-speed network. For example, farmers in the developing world do not have smartphone or their farms may not be covered by high-speed data networks. This lack of high-speed communication access is a huge roadblock to the farmers' ability to benefit from UAV-based surveillance services.

SUMMARY

Current mobile on-demand UAV services require a smartphone with access to a stable high speed data network. Such systems/methods do not work well in the context of developing countries or rural communities due to income disparity and limited network connectivity. This leaves users with non-smartphones to be excluded from the on-demand UAV marketplace. Systems and methods, according to various aspects, include an SMS-message based UAV service request system accessible to non-smartphone devices independent of software installation or access to a high-speed data network. A UAV service platform integrates the SMS-based request functionality a flight control and unmanned traffic management system, allowing mobile on-demand request of UAV services, UAV operator assignment/dispatch, and UAV operator/UAV fleet management.

According to an aspect, a method for requesting an unmanned aerial vehicle (UAV)-based agricultural service includes receiving from a user an SMS message request for a UAV-based agricultural service; in response to receiving the SMS message request, transmitting to the user one or more SMS-based prompts with predefined response options for defining the UAV-based agricultural service; generating a UAV-based agricultural service work request based on responses from the user to the one or more SMS-based prompts that comprise selections of predefined responses; transmitting automated voice calls to a plurality of UAV operators requesting acceptance of the UAV-based agricultural service work request; in response to receiving an acceptance from an accepting UAV operator during a voice call, transmitting a one-time password to the accepting UAV operator; receiving an access request from the accepting UAV operator comprising the one-time password, the UAV operator already having a pre-established account with the server-based platform; and in accordance with a successful authentication based on the one-time password, associating the UAV-based agricultural service work request with the pre-establish account associated with the accepting UAV operator.

Optionally, the method further includes receiving input from the UAV operator comprising information associated with the UAV-based agricultural service to be performed, and establishing a UAV flight plan based on the information.

Optionally, the method further includes transmitting the flight plan for controlling a UAV to obtain imaging for the UAV-based agricultural service.

Optionally, the method further includes receiving flight data generated by the UAV for monitoring completion of the UAV-based agricultural service.

Optionally, the information comprises a polygon defining an agricultural area to be imaged.

Optionally, the SMS message request is received from a non-smartphone telephone.

Optionally, the one-time password is associated with a time limit such that the access request is rejected if received after expiration of the time limit.

Optionally, the UAV-based agricultural service comprises agricultural field imaging.

Optionally, the method further includes receiving imaging captured by the UAV, analyzing the imaging according to the UAV-based agricultural service, and storing results of the analysis of the imaging for providing to the user.

According to an aspect, a server system for requesting an unmanned aerial vehicle (UAV)-based agricultural service includes one or more processors, memory, and one or more programs stored in the memory for execution by the one or more processors and comprising instructions for: receiving from a user an SMS message request for a UAV-based agricultural service; in response to receiving the SMS message request, transmitting to the user one or more SMS-based prompts with predefined response options for defining the UAV-based agricultural service; generating a UAV-based agricultural service work request based on responses from the user to the one or more SMS-based prompts that comprise selections of predefined responses; transmitting automated voice calls to a plurality of UAV operators requesting acceptance of the UAV-based agricultural service work request; in response to receiving an acceptance from an accepting UAV operator during a voice call, transmitting a one-time password to the accepting UAV operator; receiving an access request from the accepting UAV operator comprising the one-time password, the UAV operator already having a pre-established account with the server-based platform; and in accordance with a successful verification based on the one-time password, associating the UAV-based agricultural service work request with the pre-establish account associated with the accepting UAV operator.

Optionally, the one or more programs further comprise instructions for receiving input from the UAV operator comprising information associated with the UAV-based agricultural service to be performed, and establishing a UAV flight plan based on the information.

Optionally, the one or more programs further comprise instructions for transmitting the flight plan for controlling a UAV to obtain imaging for the UAV-based agricultural service.

Optionally, the one or more programs further comprise instructions for receiving flight data generated by the UAV for monitoring completion of the UAV-based agricultural service.

Optionally, the information comprises a polygon defining an agricultural area to be imaged.

Optionally, the SMS message request is received from a non-smartphone telephone.

Optionally, the one-time password is associated with a time limit such that the access request is rejected if received after expiration of the time limit.

Optionally, the UAV-based agricultural service comprises agricultural field imaging.

Optionally, the one or more programs further comprise instructions for receiving imaging captured by the UAV, analyzing the imaging according to the UAV-based agricultural service, and storing results of the analysis of the imaging for providing to the user.

It will be appreciated that any of the variations, aspects, features and options described in view of the systems apply equally to the methods and vice versa. It will also be clear that any one or more of the above variations, aspects, features and options can be combined.

BRIEF DESCRIPTION OF THE DRAWINGS

The invention will now be described, by way of example only, with reference to the accompanying drawings, in which.

DETAILED DESCRIPTION

Figure 1:
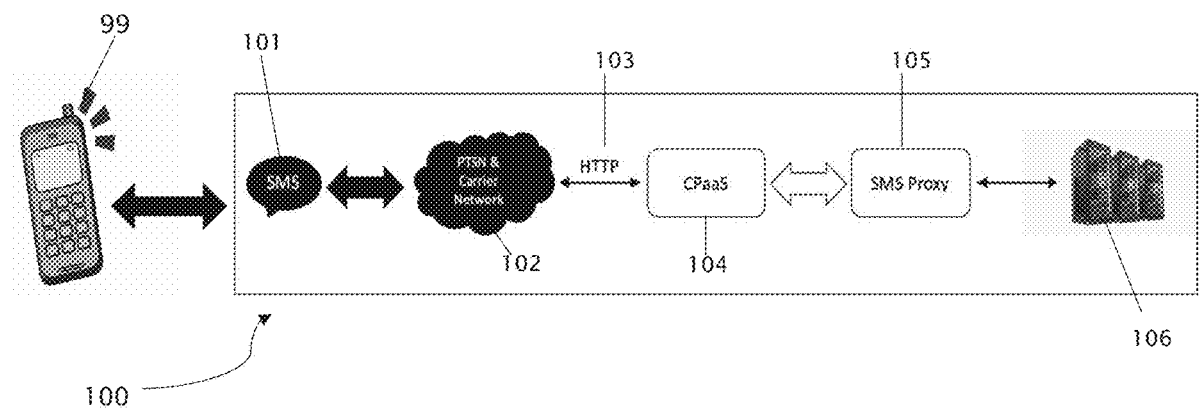
FIG. 1 illustrates an exemplary workflow for a user to request a UAV service via a UAV-based agricultural service platform.

Systems and methods, according to the principles described herein, provide a UAV-based agricultural service platform that provides access to UAV-based agricultural surveillance services to farmers in areas, such as sub-Saharan Africa, that lack access to high-speed communication infrastructure either because the high-speed communication infrastructure does not service the area or because the farmer lacks a smartphone or other computing device that can access the otherwise available infrastructure. According to various aspects, a farmer can request a UAV-based surveillance service via simple SMS-based messaging. The farmer is provided with a series of SMS-based prompts, and the farmer's selections in response to those prompts are used to generate a UAV surveillance work request. UAV operators are alerted to the request and can accept the request. An operator that accepts the request can use the platform to develop a UAV flight plan that will provide the surveillance needed to meet the needs of the farmer. The platform can monitor the progress of the UAV's surveillance and can receive the surveillance imaging from the UAV.

Existing UAV services require UAV operators to use multiple different platforms to market their services, assign work orders, plan missions, and managing the movement of pilots and UAVs. In addition to this, these platforms do not factor in the unique regional challenges associated with sub-Saharan Africa and other rural and underdeveloped regions. These regional challenges include the slow adoption rate of smartphones, as well as the lack of access to high-speed data networks among rural farmers and other agricultural stakeholders. These challenges inhibit rural agri-stakeholders from accessing on-demand agronomic extension services of UAV drone operators. Systems and methods, according to the principles described herein, provide these stakeholders with the ability to circumvent the use of smartphones and the reliance on a high-speed data network to still access to on-demand UAV-based surveillance services.

According to various aspects, systems and methods implement a server-based (including cloud-based) platform that integrates a front-end Communications Platform as a Service (CPaaS) Short Message Service (SMS) work flow and centralized input collection database, with a flight control and unmanned traffic management (UTM) system that enables an end user to request on demand unmanned aerial vehicle (UAV) (also referred to as "aircraft" and "drone") services using nothing more than a T-9 mobile device with only tactical keypad input. Functionality of the solution is accessible on all networks, including 2G, EDGE, HSPA+, 3G, 4G, or SG, independent of software installation on a phone OS. The platform includes a front-end CPaaS SMS workflow, input selection database, and flight control and unmanned traffic management systems, making UAV services available on-demand for both smartphone & non-smartphone users independent of location or network connectivity limitations.

In various embodiments, a UAV-based agricultural surveillance service platform, will initiate a CPaaS SMS workflow based on receiving an SMS message from a non-smartphone mobile device. In a preferred format, users will be prompted with questions and numerical selections for input. User selections will be collected in a centralized server database and populated into a ticket order file which is then uploaded to the flight control system via a symlink file upon completion of the workflow. Once uploaded into the flight control system, regional operators are alerted to open ticket order via programmed voice call based on end user regional selection in CPaaS workflow. Operators are prompted to press a key, e.g., "press 1", to accept ticket order. Operator then sent one-time password (OTP) via SMS. Upon first entry of OTP in flight control system operator is assigned to ticket order. Respective operator will reference ticket file for user contact to schedule date of service and input details in the flight control system file including, but not limited to, user full name, site location and size of area to be covered (acreage approximation). The operator is then permitted to pre-plan the flight mission by tracing a polygon on a georeferenced map, delineating other parameters such as, but not limited to, flight path, altitude, and speed of the UAV. Once pre-set, the operator is able to return back to the mission and make parameter changes prior to dispatch or while in the field, including manually via controller. On scheduled date of service, the operator will report to the site of service, and through a mobile device, start the mission. Once the UAV is in mission, bi-directional data transmission between the UAV and a data acquisition unit will begin, providing live and video playback of a UAV or fleet of UAV's parameters, including but not limited to, location (flight path), air speed, altitude, vertical acceleration, heading and time.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 illustrates a workflow 100 for a user (e.g., a farmer or other agricultural stakeholder) to request a UAV service via a UAV-based agricultural service platform 106. The UAV-based agricultural service platform 106 comprises one or more servers connected by one or more networks and can include a cloud-based platform. The platform 106 may include and/or communicate with one or more third-party services (e.g., via one or more API's). The CPaaS workflow 100 is triggered by an SMS message 101 sent from a T-9 enabled device 99 via a public switched telephone network (PSTN) and/or carrier network 102. The device 99 can be a mobile phone, such as a non-smartphone mobile phone, belonging to a farmer or other agricultural stakeholder. Through a hypertext transfer protocol 103, the SMS message is received by the CPaaS 104 and provided to the platform 106 via an SMS proxy 105. The platform 106 responds to an initial SMS message from the user with one or more SMS messages that include prompts for information about the UAV-based agricultural service that the user would like to obtain. The user responds to the prompts with SMS-based selections (e.g., numerical selections), which are recorded by the platform 106.

Figure 2:
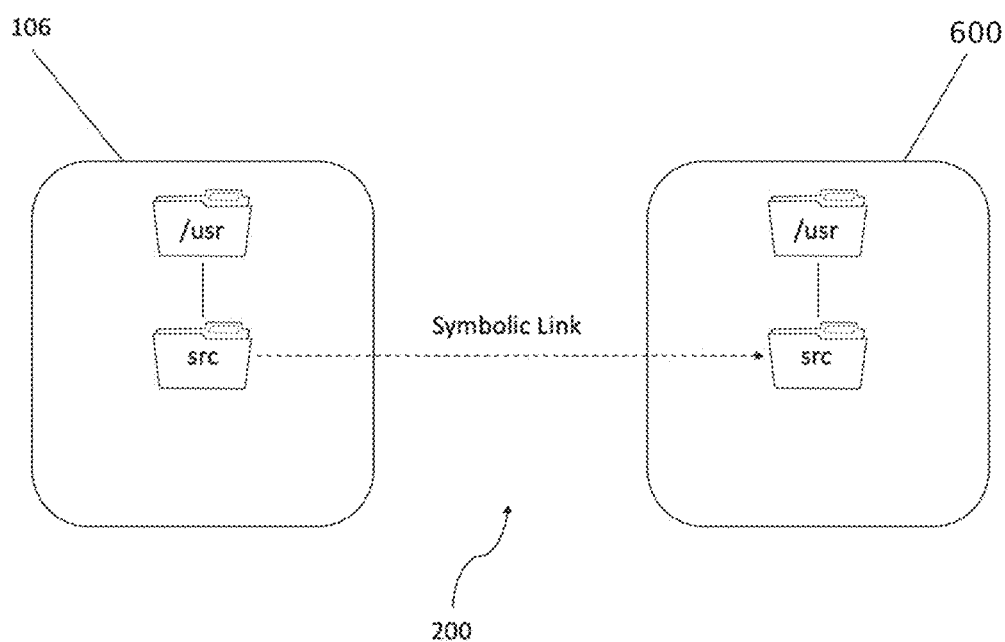
FIG. 2 illustrates an exemplary symbolic link file storing information associated with a UAV-based agricultural service request.

At completion of the SMS workflow 100, information derived from the responses from the user to the SMS-based prompts can be stored in the platform 106, such as within a symlink file 200 as shown in FIG. 2. The information can then be uploaded to a flight control system 600 for use by a UAV operator to complete a UAV mission for the requested UAV service. The flight control system 600 can be a part of the platform 106 or can be a third-party service accessible via the platform 106.

Figure 3:
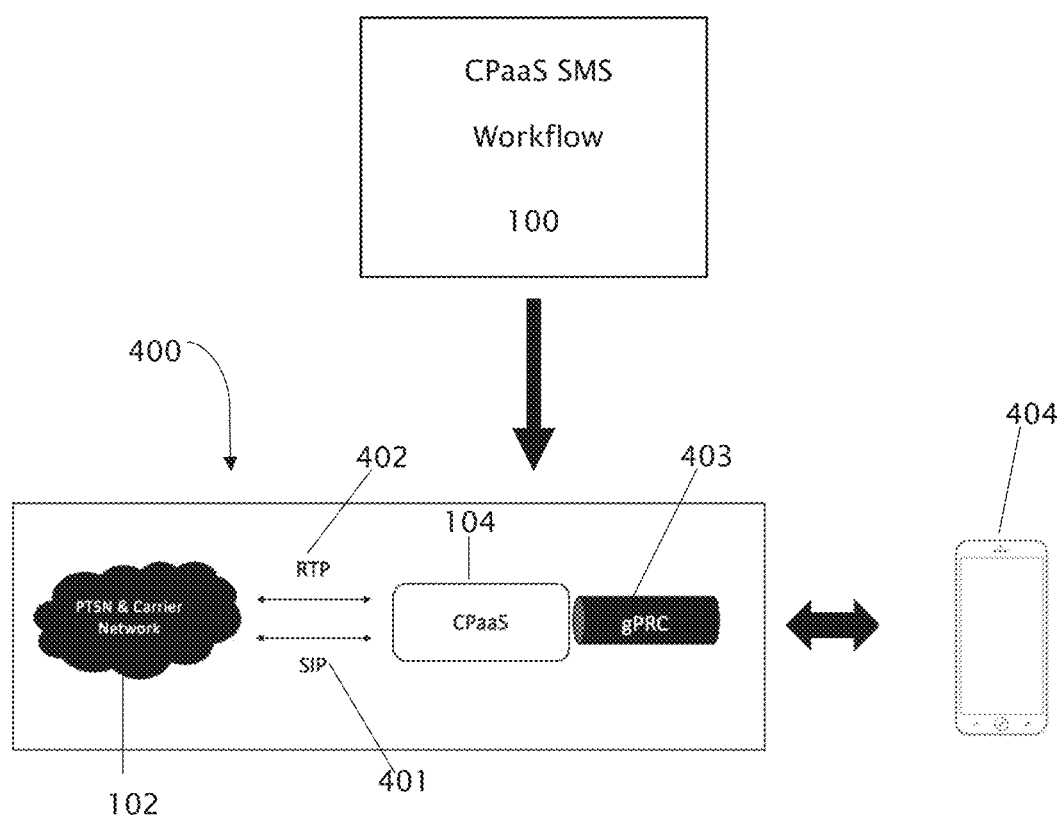
FIG. 3 illustrates an exemplary process for alerting drone operators to a new UAV-based agricultural service work request.

FIG. 3 illustrates the process initiated by the platform 106 for alerting drone operators to a UAV-based agricultural service work request generated upon upload to the flight control system 600 of the information from the user. Upon creation of the work request, an automated voice call 400 is sent to a phone 404 of one or more UAV operators. The voice call 400 can be sent via a PTSN and/or carrier network 102 using a session initiation protocol (SIP) 401 which then forwards voice message packets via a real-time transport protocol 402.

Figure 4:
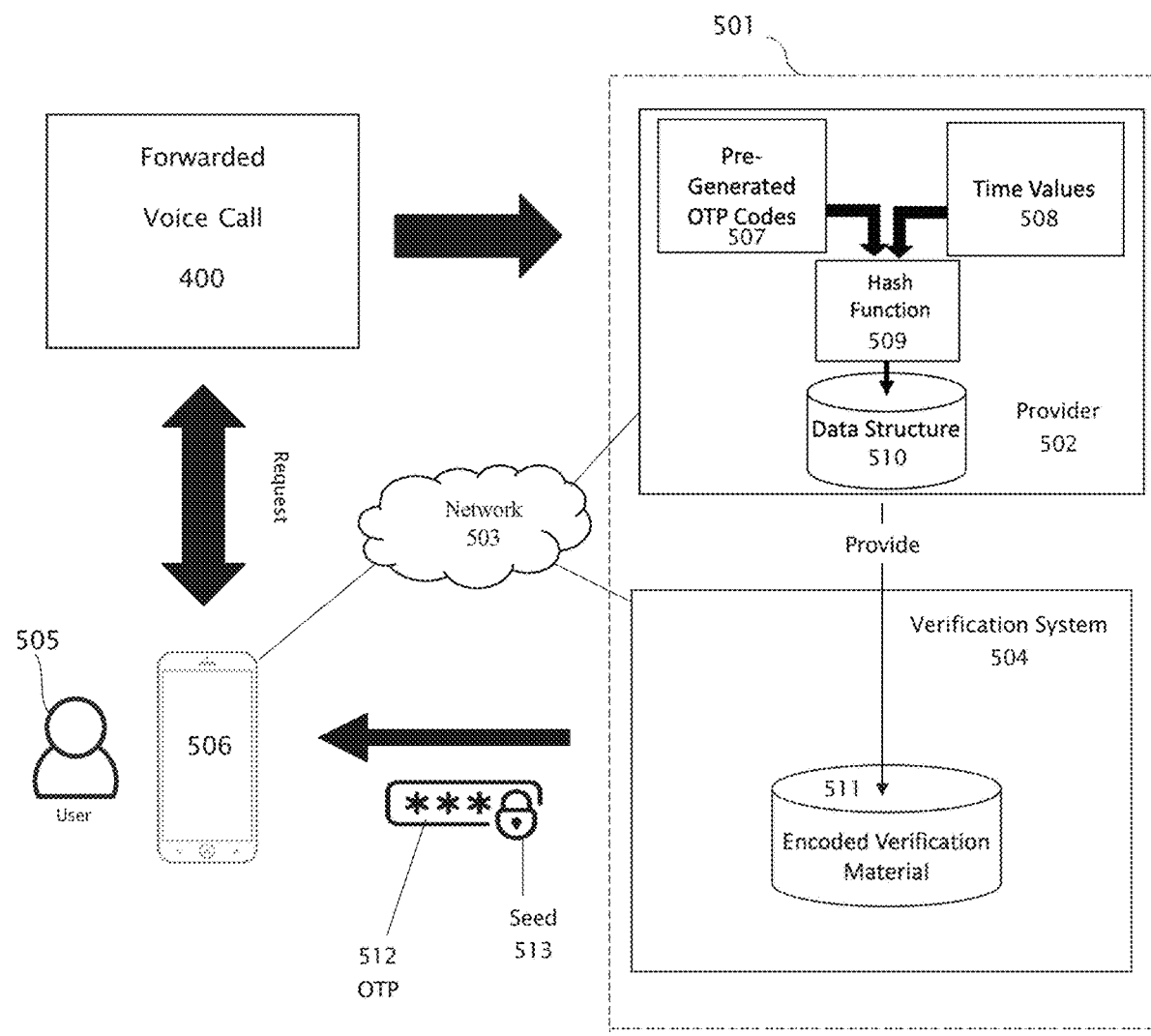
FIG. 4 illustrates exemplary aspects of a UAV operator accepting a UAV-based agricultural service work request.

FIG. 4 illustrates aspects of a UAV operator accepting a UAV-based agricultural service work request. The UAV operator 505 receives the voice call 400 originated by the platform 106 and provides an input to accept the work request. In response to the acceptances, an OPT (one-time password) system 501 provides an OTP code 512 generated by an OTP generator 502 to the UAV operator 505 via a communication device 506 of the operator. The communication device 506 can be the same device 404 on which the UAV operator received the voice call or can be a different device. The OTP code 512 can be provided via an SMS message or in any other suitable format. In illustrated embodiment, the OTP provider 502 maintains pre-generated OTP codes 507 with predefined time values 508 which are encoded by hashing 509 and stored in a data structure 510. In accordance with some embodiments, the data structure is provided to a verification system 504 (e.g., over a network 503). One or more functional components of the OPT system 501, e.g., the verification system 504 and/or the OPT provider 502, can be implemented by the platform 106 or can be third-party services used by the platform 106. In the illustrated embodiment of FIG. 4, the verification system uses verification material 511 to authenticate the request from the UAV operator 505 using a device 506 including but not limited to, a computer, mobile phone, smartphone, or tablet. The request can include the OTP code. Once the access request has been received by the verification system 504, it can validate the request based at least in part on the OTP contained in the request. For instance, the verification system can verify whether the OTP code in the request matches any of the OTP codes in the verification material 511 obtained by the provider 502.

The flight control and UTM systems are commonly used in the trade of UAV operation. In various embodiments, the flight control system 600 as disclosed herein receives inceptor inputs, sensor inputs, and/or forces and moments to which such inceptor and/or sensor inputs have been mapped (static or includes time history of said p/inceptor and/or sensor inputs), and determines an optimal mix of actuators and associated actuator parameters (position, speed of rotation, etc.) to achieve the requested forces & moments. In some embodiments, optimization may be performed at least in part by modeling one or more costs, such as battery power consumed to drive electric motor-driven lift fans and/or other rotors/propellers, time to move control surfaces, drag associated with control surfaces, etc.

The model may be used on board the aircraft, in real time (sometimes referred to herein as "online"), to determine an optimal set of actuators and associated parameters to achieve the requested forces and moments.

Figure 5:
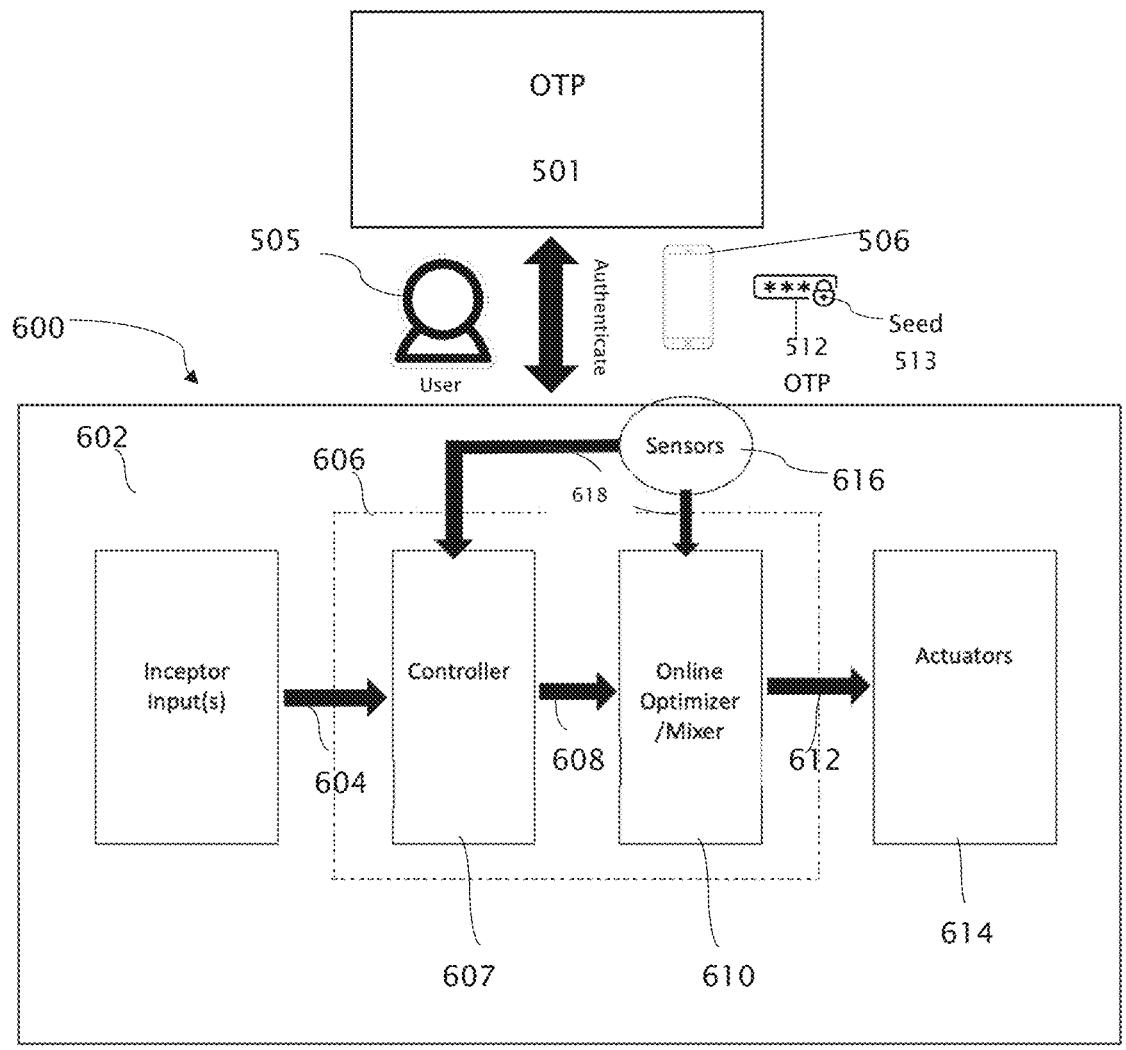
FIG. 5 illustrates aspects of an exemplary flight control system for generating a flight plan for a UAV.

As illustrated in FIG. 5, the flight control system 600 includes a set of inceptors 602 configured to provide inceptor inputs 604 to a flight control computer 606 that incorporates a controller 607 and an optimizer/mixer 610 online. In various embodiments, inceptors 604 may include input tools, such as but not limited to, a stick, throttle, rudder, collective, joystick, thumb stick, and/or other input devices 607 configured to be manipulated manually by an operator to control the an aircraft in flight 700. Such inceptor devices and/or associated electrical components may be configured to receive one or multiple input signals 604 with reference to roll direction, roll rate, yaw direction, yaw rate, pitch angle, pitch rate, altitude, altitude rate and/or forward or other speed, position and/or thrust input signal. The manual input device, such as a controller 607, also intercepts sensor data 618, including but not limited to air speed, air temperature, air static pressure, acceleration(s), angular rates, GPS data, camera or other image data, from sensors 616. Controller 607 capabilities also include translation of aggregates, and/or otherwise processes and/or interprets the received inceptor inputs 602 and/or sensor data 618 to generate and provide as output associated forces and/or moments 608, in which the aircraft 700 is subject via its control assets (e.g., propellers, rotors, lift fans, aerodynamic control surfaces, etc.; referred to herein as "actuators") to maneuver the aircraft in a fashion determined based at least in part on the inceptor inputs and/or sensor data. In various embodiments, forces/moments 608 may encompass forces and/or moments along/or about one or more axes of the aircraft, such as x, y, and z axes, corresponding to longitudinal, transverse, and vertical axes of the aircraft, respectively, in various embodiments.

As demonstrated in FIG. 5, the flight control system 600 includes an online optimizer/mixer designed to receive forces/moments as inputs. However, in prior embodiments, the flight control system may also include offline mapping. In example, a varied combination of forces/moments 608 that could be called for during a flight mission may be mapped in advance, e.g. using heuristics, engineering judgment, etc., to corresponding sets of actuators and associated actuator parameters (e.g., rpm, power, control surface angle, as applicable). In contrast, as described, the online optimizer/mixer 610 receives forces/moments 608 as input and actively computes (online) a set of actuators and associated commands/parameters 612 to minimize desired cost function as relates to the current state of the system. As demonstrated, actuators 614 are set-up to operate in accordance to actuator commands/parameters provided by optimizer/mixer.

As illustrated, sensors 616 provide sensor data 618 to the online optimizer/mixer 610. Examples of sensors 616 and/or sensor data 618 may include, but are not limited to, airspeed, temperature, or other environmental conditions; actuator availability, failure, and/or health information; aircraft altitude, altitude, and/or other position information; presence/absence of other aircraft, debris, or other obstacles in the vicinity of the aircraft; actuator position information; etc. In various embodiments, an optimal set of actuators and associated parameters to achieve a requested set of forces and moments can be achieved, upon configuration of the on line optimizer/mixer 610 to receive sensor data 618. For example, in some embodiments, four or more propellers/lift fans are offered to lift an aircraft into the air, enable the aircraft to hover, control aircraft altitude relative to the horizontal, etc. In some embodiments, incapacity of a propeller/lift fan can be reflected in sensor data 618, resulting in an automatic response by online optimizer/mixer 610, which enables an optimal set of actuators and parameters 612 that omits the failed propeller/lift fan. Relative to such a response, in some embodiments, sensor data relaying diminished power/performance, overheating, etc., may be taken into consideration such as by adjusting the actuator effectiveness model and/or the actuator constraints (e.g., minimum/maximum speed, torque, deflection, rate of change, etc.).

Figure 6A:
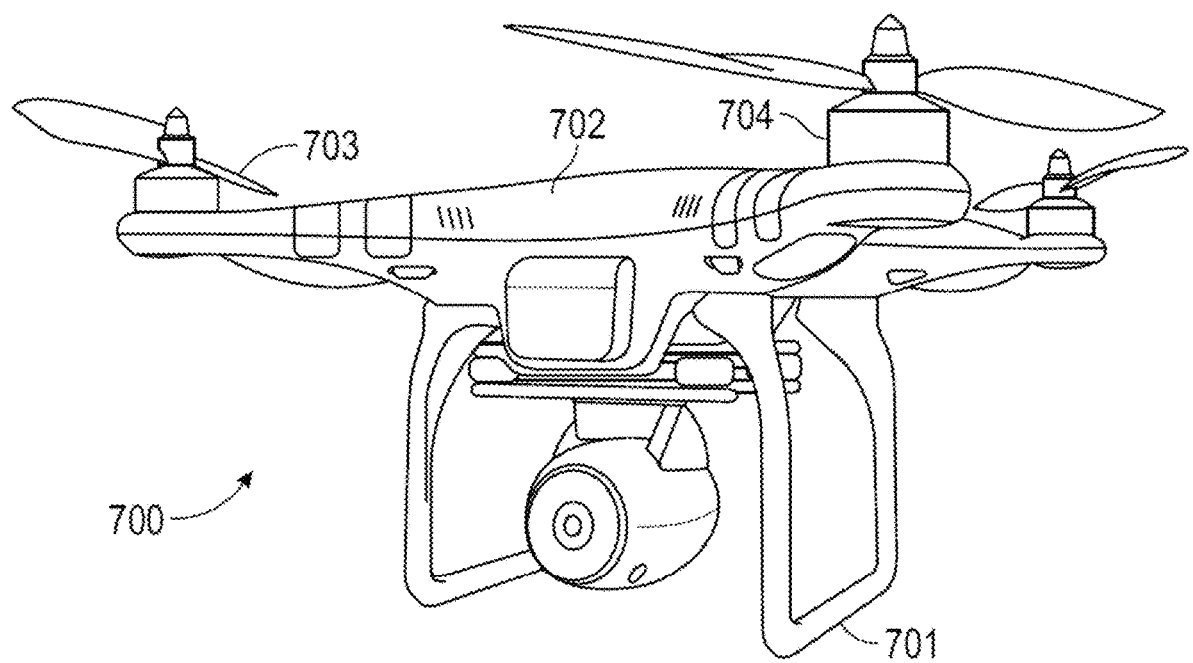
FIG. 6a-c illustrate exemplary aspects of UAVs.
Figure 6B:
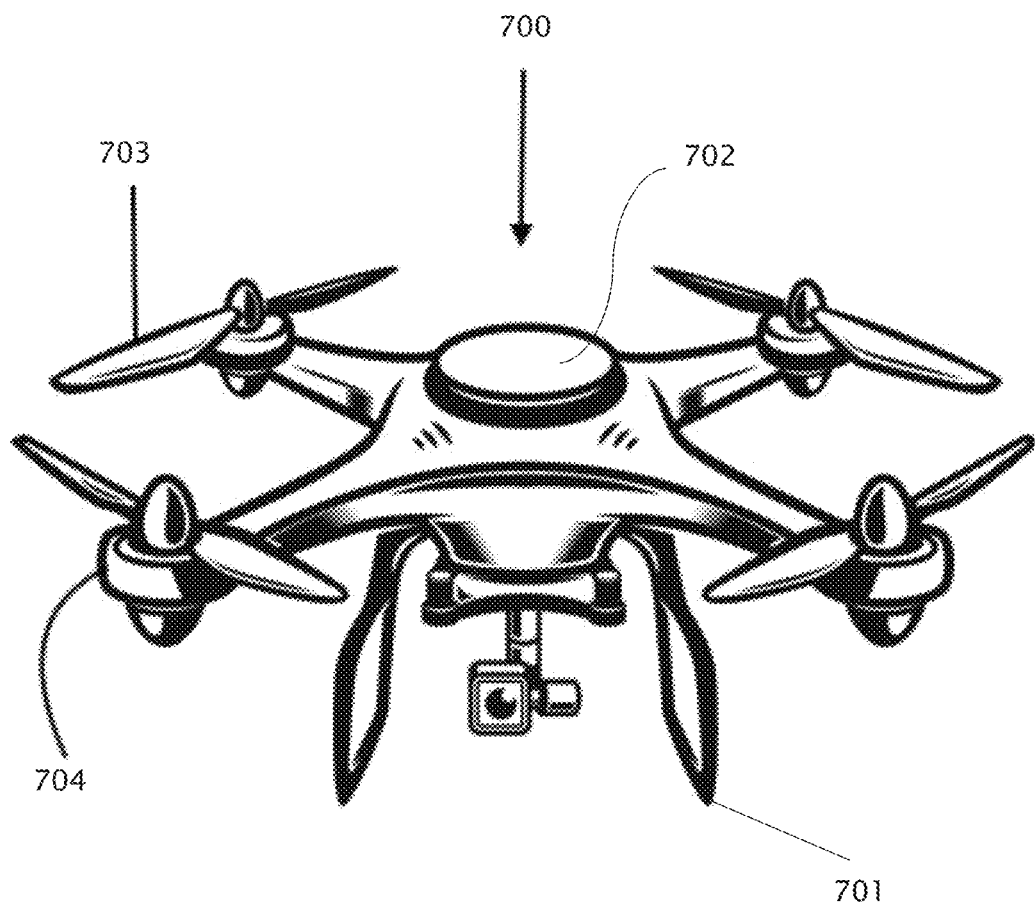
Figure 6C:
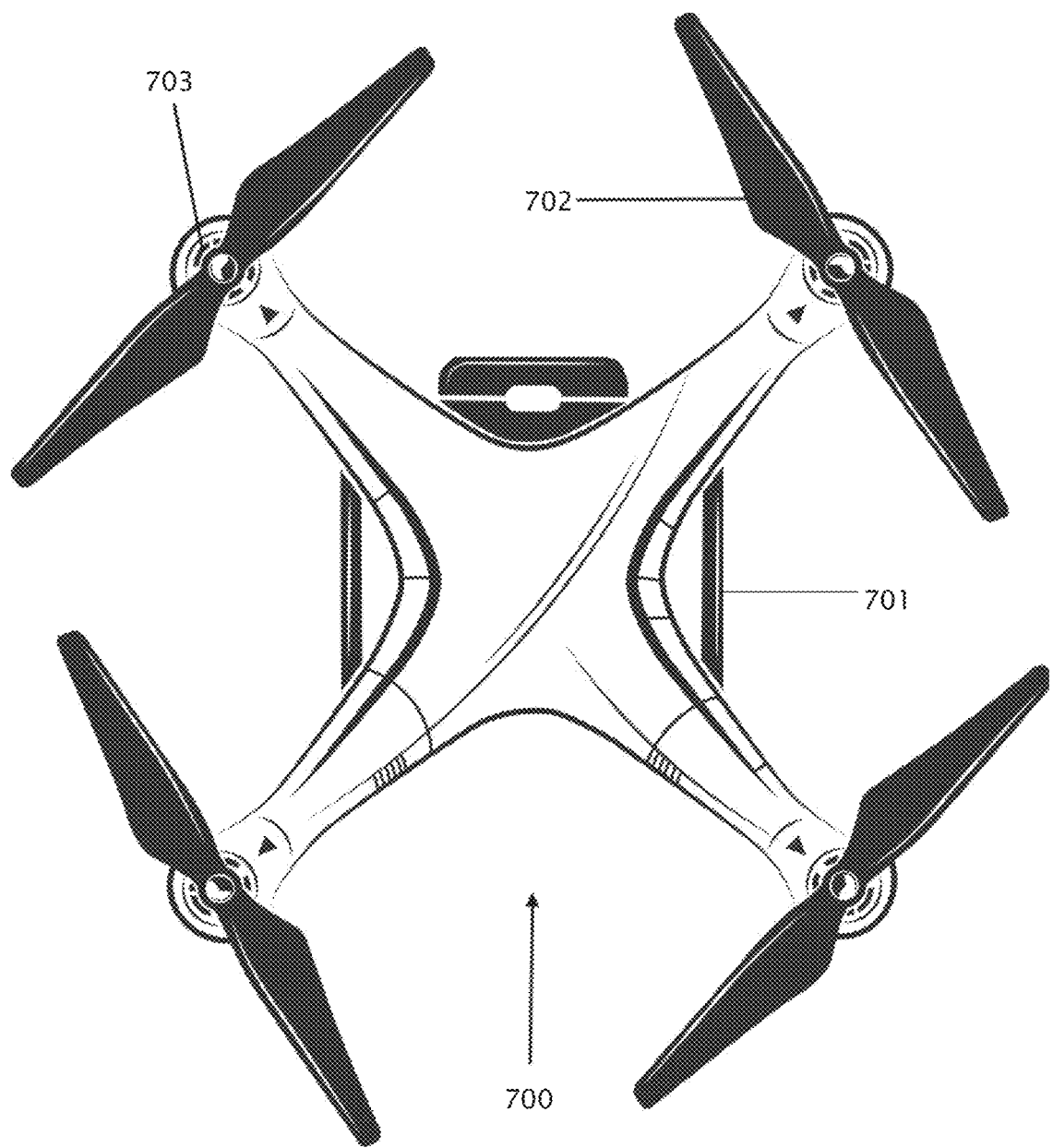

In various embodiments, a flight control system 600 such as the one described, may be embodied in an aircraft 700 as illustrated in FIG. 6A. The aircraft may include landing gear 701 & a fuselage (body) 702. A set of more than one underwing pylons 704 is provided under each propeller/lift fan 703. Each pylon 704 may have two propeller/lift fans, mounted thereon, one forward of the wing and one aft. Each propeller/lift fan 703 may be driven by an associated drive mechanism, such as a dedicated electric and/or gas motor.

One of more batteries and/or onboard power generators may be used to drive then propeller/lift fans 703 and/or charge/recharge onboard batteries.

In various embodiments, each pylon 704 is positioned horizontally relative to a vertical axis of the aircraft such as that the propellers/lift fans 703 are mounted thereon. In various embodiments, the effective forces and moments capable of being provided by each respective propeller/lift fan may be stored onboard the aircraft 700 in a memory or other data storage device associated with the onboard flight control system. In various embodiments, a data structure such as a matrix, table, or database may be used, with effectiveness under different operating conditions potentially stored. In example, effectiveness of a propeller/lift fan or control surface may differ considering conditions such as airspeed, temperature, etc. In various embodiments, forces and moments expected to be generated by a propeller/lift fan or other actuator under given conditions may be deducted or otherwise diminished, e.g., by a factor determined based at least in part of environmental conditions or other variables, for example, measure of propeller/lift fan motor health.

Figure 7:
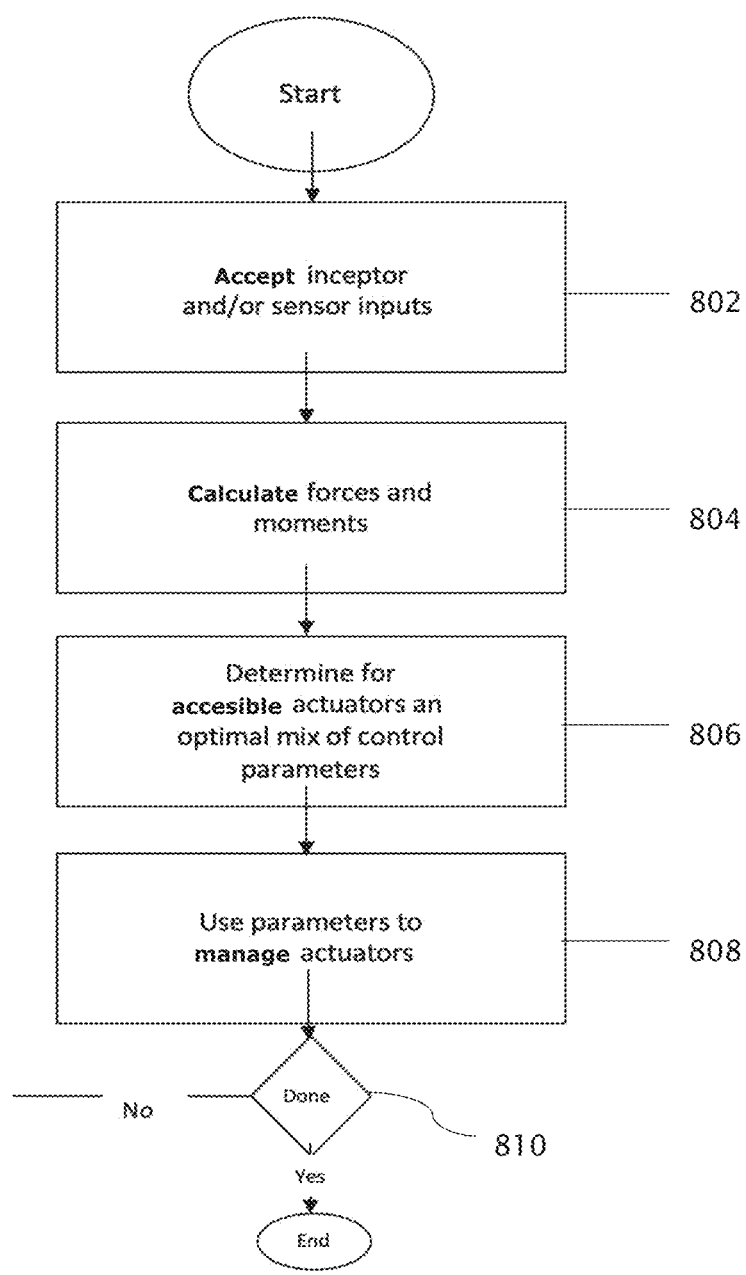
FIG. 7 illustrates an exemplary flight control method performed by a UAV.

In various embodiments, the process of a flight control system as shown in FIG. 7, includes a set of inceptor inputs and/or sensor data 802 is received. Forces and moments are computed 804 and applied to the aircraft in response to the received inceptor inputs and/or sensor data. To accomplish the requested forces and moments 806, an optimal arrangement of currently available actuators, and for each a corresponding set of one or more actuator parameters, are set. This vector of actuator commands is the optimal solution that reduces the cost associated with a desired cost function in the specific set of conditions. Respective actuator parameters are used to regulate the corresponding actuators 808. Successive iterations are duplicated until the flight control process is done 810, e.g., the aircraft lands and is turned off.

Figure 8:
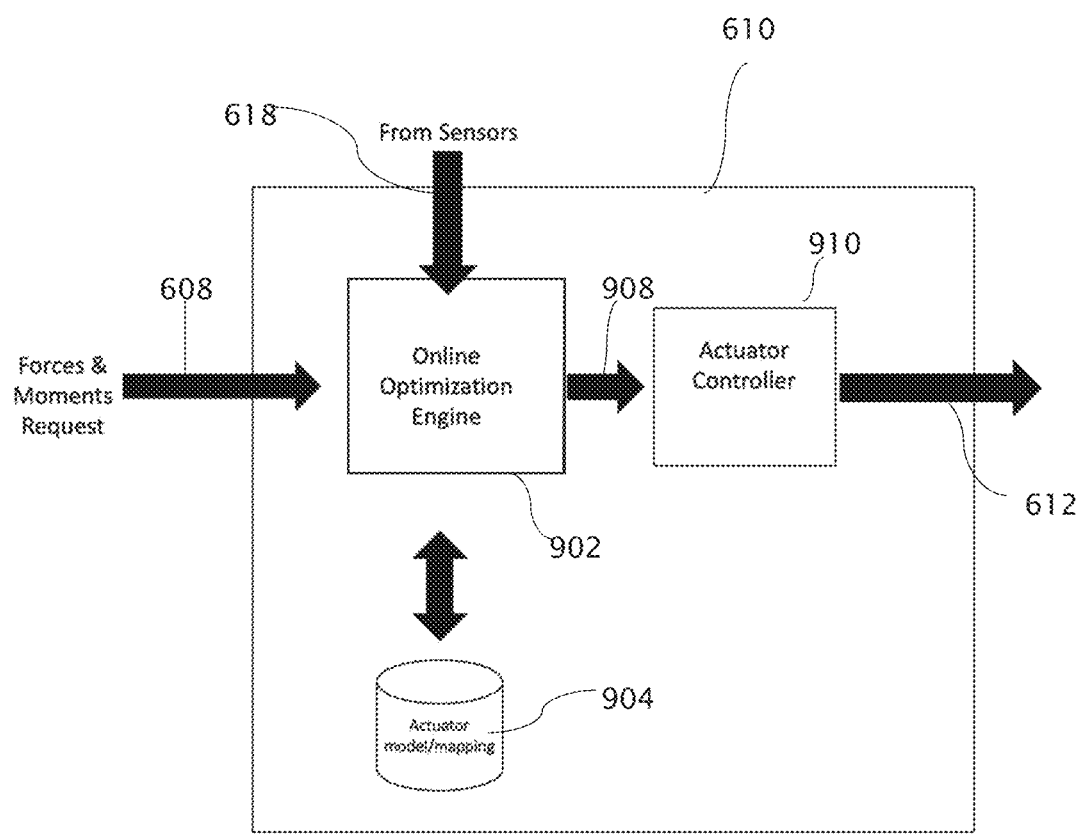
FIG. 8 is an exemplary functional block diagram of a UAV.

As shown in FIG. 8, in various embodiments, an online optimization and mixing element may be used to enforce online optimizer/mixer 610. In various embodiments, online optimizer/mixer 610 includes an online optimization engine 902 configured to receive requested forces and moments 608, compute an optimal set of actuators and associated actuator parameters 908, to achieve the requested forces and moments 608 at a minimal cost function. As presented, the online optimization engine 902 uses an actuator model and/or effectiveness mapping associated with the actuators available in its solution to achieve requested force(s) and moments 608. In example, under various conditions, the practical force(s) and moment(s) corollary to a range of actuator parameters can be signaled in actuator model/mapping 904. This can be accompanied by sensor data 618 to be used to determine actuator effectiveness and/or otherwise an optimum solution. In some embodiments, online optimization engine 402 may decide a set of actuators to be used to accomplish requested forces and moments 608 established, in part, on the consideration of sensor data. In example, propellers/lift fans may be considered less efficient and/or inaccessible above a certain airspeed, air temperature, etc. A propeller/lift fan may be considered to have a reduced effect for a given actuator parameter value (e.g., power, current, rpm) based on, but not limited to, air temperature or propeller/lift fan motor temperature. In some embodiments, constraints such as but not limited to, maximum control surface deflection or maximum rotor RPM, may be reduced at a high dynamic pressure to limit/restrain loads on the structure.

Online optimization engine 402 provides an optimal solution (actuator and corresponding actuator parameters) 908 to actuator controller 910, which generates reciprocal actuator control signals, commands, voltages, etc. 612. In various embodiments, online optimization engine 902 may be a software module and/or process operating on a special purpose of general purpose processor. Herein as illustrated in FIG. 8, the elements shown may be included and incorporated into a flight controller, such as a flight control computer. In such an embodiment, forces and moments may or may not be computed as a transitional step.

Figure 9:
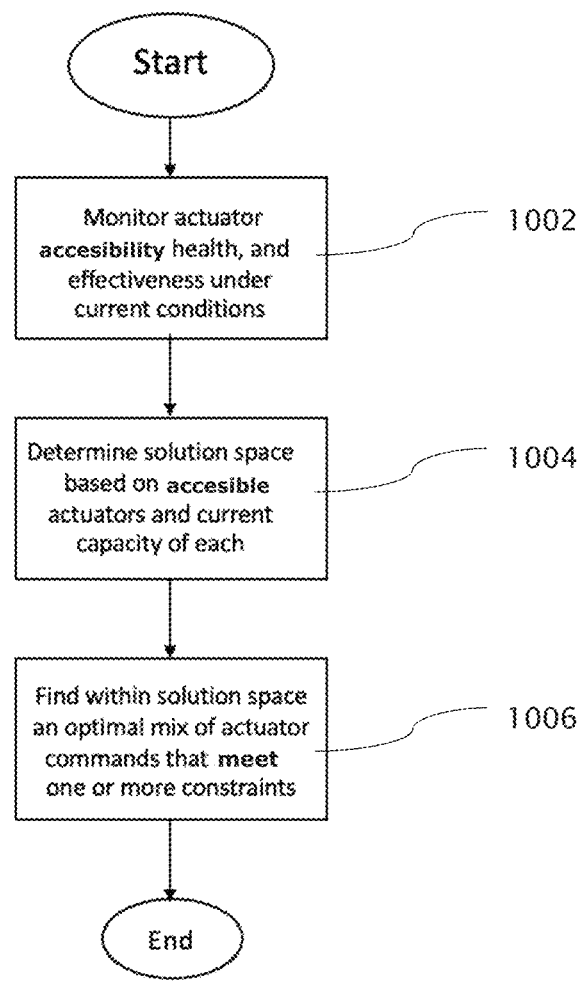
FIGS. 9 and 10 illustrate an exemplary actuator control process performed by a UAV.
Figure 10:
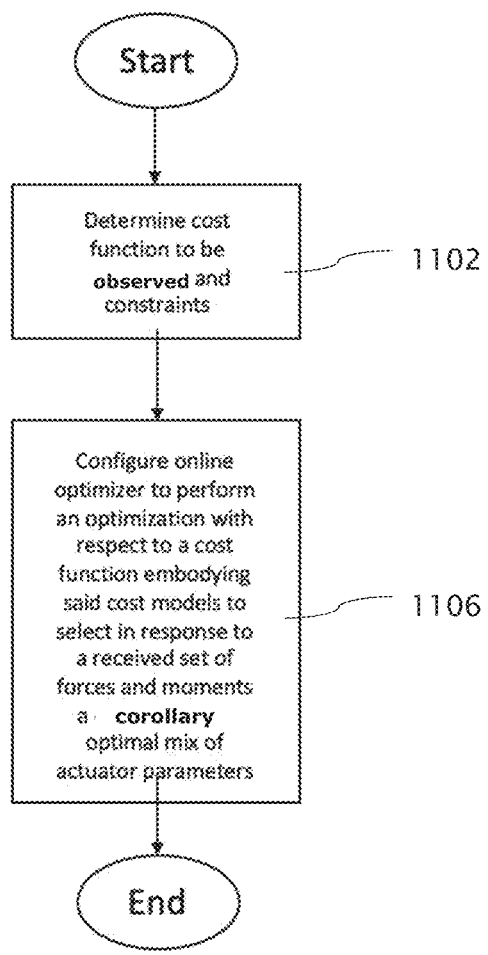

As shown in FIGS. 9 and 10, an optimal mix of actuators and associated parameters are determined while actuator availability, health and/or effectiveness under current conditions are monitored 1002. In example, failure of one or more propeller/lift fans and/or other actuators, such as aerodynamic control surfaces, may be identified. In some embodiments, degradation in propeller/life fan performance (e.g., maximum speed) may be measured, detected and/or deduced from indirect indications, such as but not limited to, electric motor temperature, air temperature, and airspeed. A solution space within which an optimal set of accessible actuators and corresponding actuator parameters is to be determined 1004. In examples, a solution that takes into consideration which actuators are accessible (e.g., haven't failed aren't excludes from use due to current air speed, etc.) and for each a minimum and/or maximum command is decided in step 1006.

The solution space may be defined at least in part by one or multiple constraints or cost functions. In FIG. 10, at step 1102 a cost function is used to explore the solution space to identify a solution that minimizes the cost function. For example, a maximum power constraint may be enforced to refrain from damaging circuitry, batteries, power supplies, etc. and/or to avoid or minimize excessive draw of battery power. Other examples of constrains include, but are not limited to, collective thrust of a set of propellers/lift fans, e.g by way of ensuring a solution that minimizes power consumption is resolved. In various embodiments, any constraint capable of being expressed, approximated, or computed may be enforced. In an embodiment where the solver uses linear relationships, any linear constraint can be imposed. Many non-linear constraints can also be estimated by liner or linear-by-part approximations. At step 1106, an online optimizer is configured to perform an optimization with respect to a cost function implementing the cost models to determine an optimal set of actuator parameters.

In various embodiments, the UTM system is directed to an aircraft data transmission system used with an aircraft having a data acquisition unit. The aircraft maintains a data acquisition unit that includes a digital flight data acquisition unit (DFDAU) processer which includes a storage media for storing flight data in a digital format. The DFDAU processor receives signals from sensors which sense parameters such as, but not limited to, air speed, altitude, vertical acceleration, heading & time. The system also includes a cellular infrastructure which is automatically in communication with the data communications unit during flight and after the aircraft has landed. The system further includes a data reception unit, such as a mobile device or tablet, in communication with a server.

Figure 11:
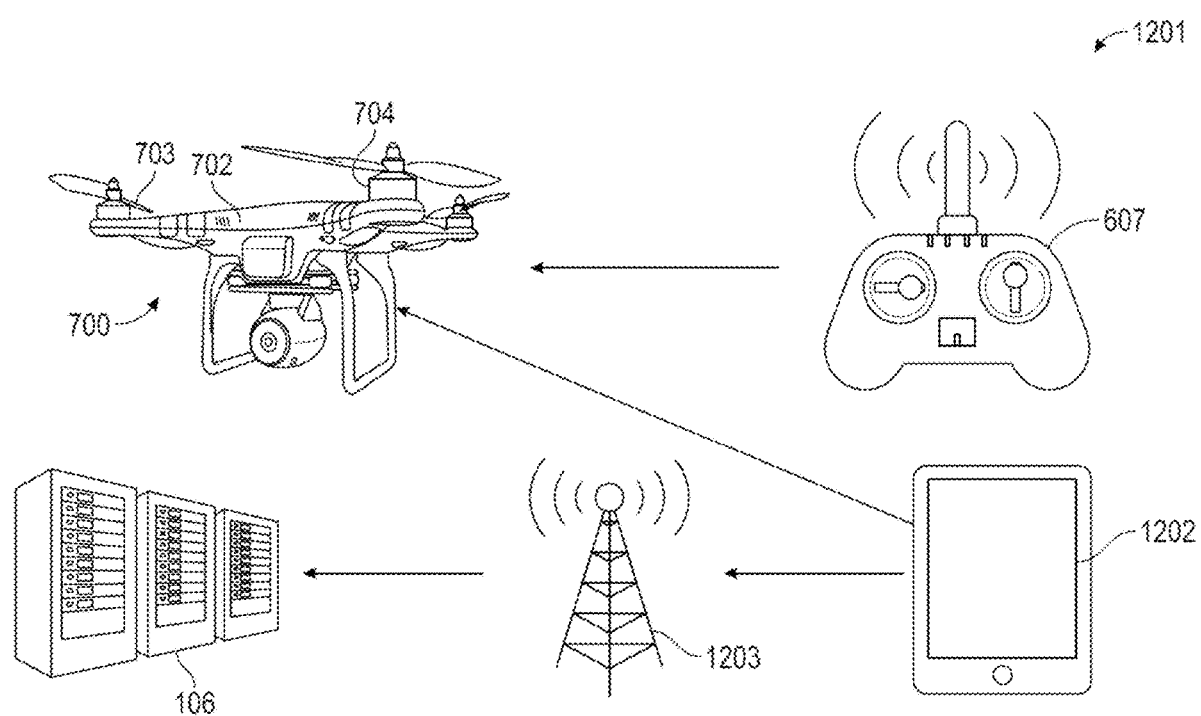
FIGS. 11 and 12 illustrate aspects of an exemplary UAV data acquisition and transmission system.

FIG. 11 illustrates an aircraft data acquisition and transmission system 1201. An aircraft 700 which has stored flight data, encompassing forces and moments dictated by a controller 607. The aircraft 700 transmits flight data as cellular communication signals to a data reception unit 1202, such as a mobile device or tablet. The data reception unit 1202 acts as a communication channel to the communications medium

1203. Through the communication medium 1203, the flight data is transmitted to the platform 106.

Figure 12:
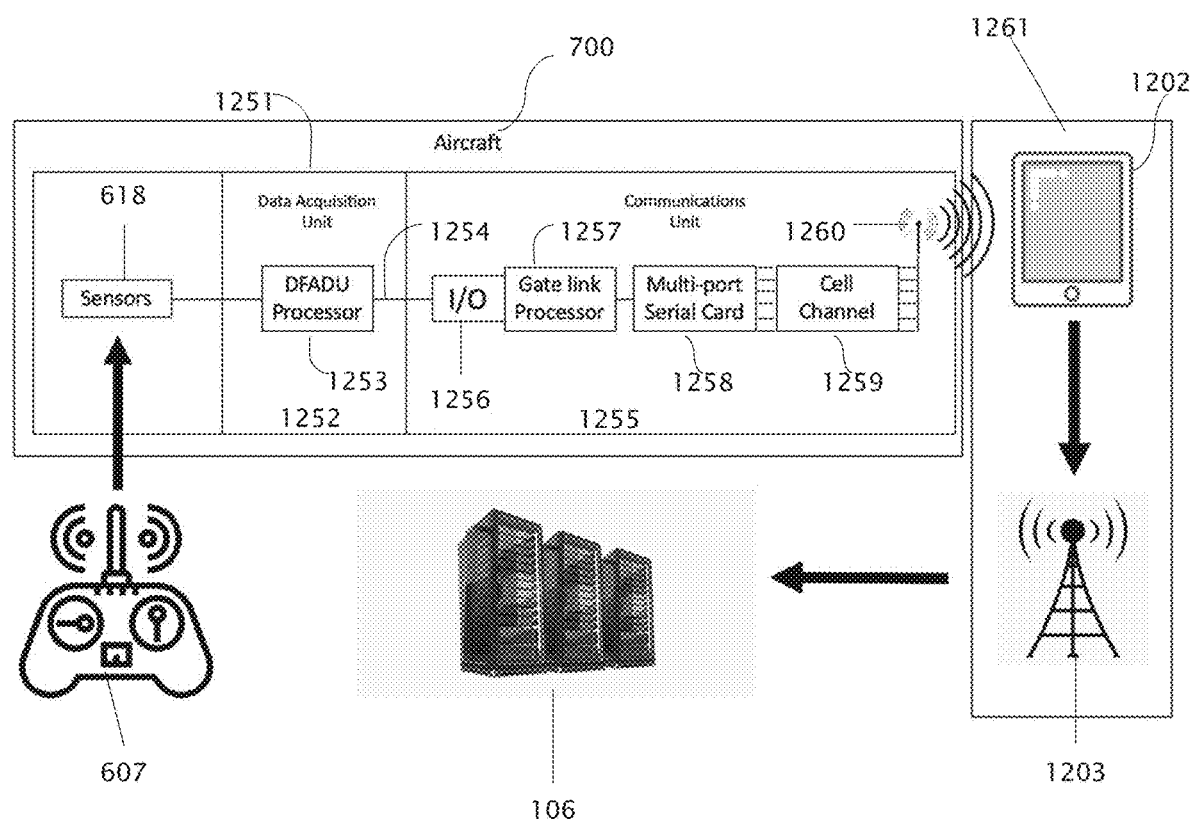

FIG. 12 is a diagram illustrating a detailed embodiment of the system 1201 illustrated in FIG. 11. The aircraft 700 includes a data system 1251. A data acquisition unit 1252 includes a digital flight data acquisition unit (DFDAU) processor 1253, which maintains a storage medium for storing flight data, such as but not limited to forces & moments, in a digital format. The DFDAU processor 1253 receives signals from sensors 618 which sense parameters such as, but not limited to, air speed, altitude, vertical acceleration, & heading time. The flight data is transferred to a communication unit 1255 via a bus 1254. The bus 1254 is joined to an I/O interface 1256 in the communication unit 1255. The I/O interface 1256 can be a standard bus interface.

The I/O interface 1256 is joined to a gate link processor 1257. The processor 1257 can be a general purpose processor such as a personal computer, a microprocessor such as an Intel Pentium processor, or a special purpose processor such as an application specific integrated circuit (ASIC) designed to operate in the system 1201. The processor 1257 produces the data for transfers and transmits the data to a multi-port serial card 1258. Each I/O port of the card 1258 is fixed to a cell channel which can open, sustain, and close a physical, over-the-air channel to the cellular infrastructure 1261. The cell channels 1259 can transmit at the same time and can thus transmit data in parallel. Each cell channel 1259 is attached to an antenna matching network and a post amplifies (not shown). An antenna 1260 is maintained internally within the aircraft 700 to optimize free space radiation to the cellular infrastructure 1261. The data is transferred over a cellular airlink using the physical layer modulation of the cellular infrastructure 1261. The cellular infrastructure 1260 includes a data reception unit 1202, which is within free-space radiating range of the aircraft 700. The data reception unit leverages the communication medium (data network) 1203 to transmit flight data to the server 106.

Figure 13:
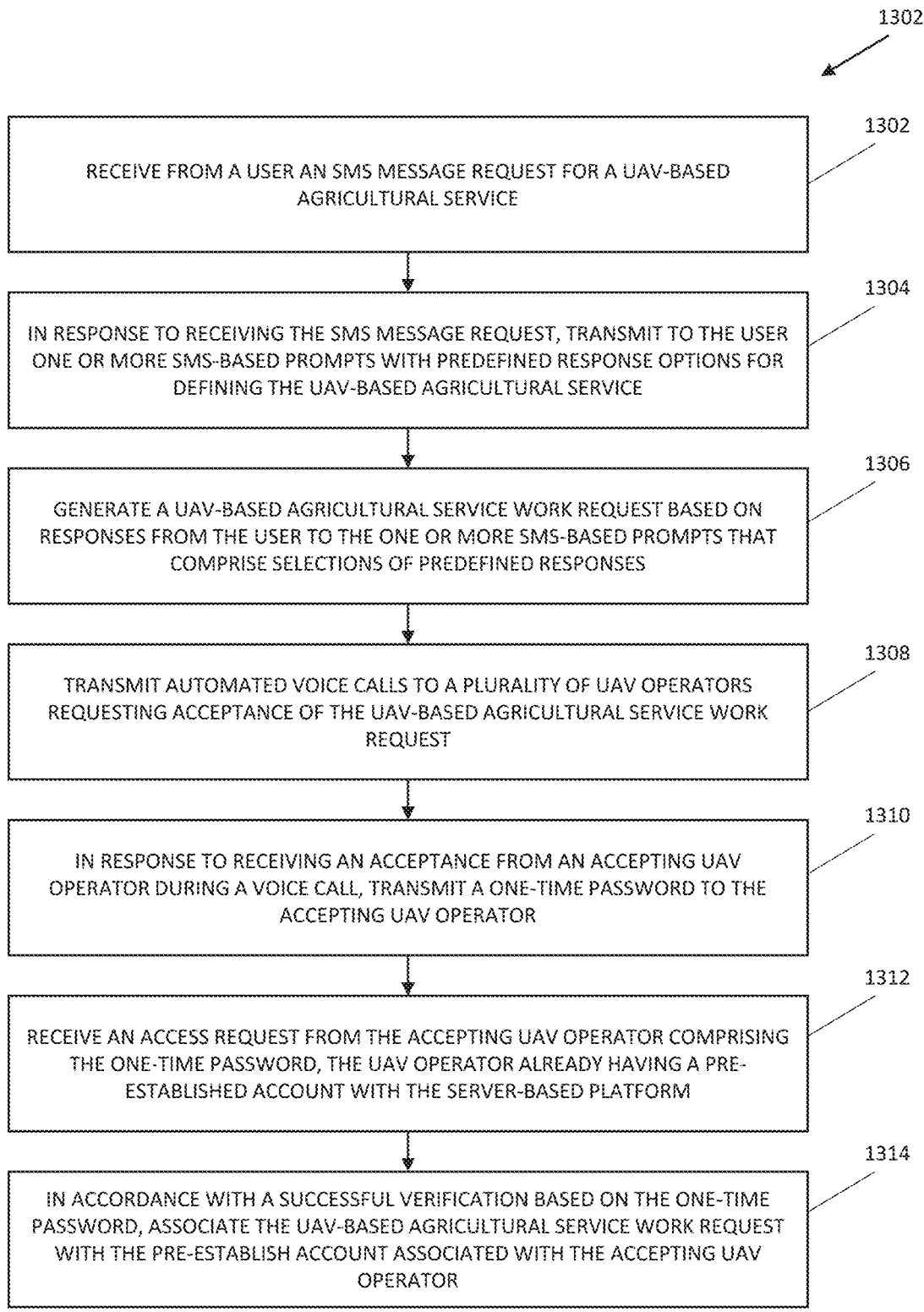
FIG. 13 illustrates an exemplary method for requesting a UAV-based agricultural service according to various aspects of the principles described above.

FIG. 13 illustrates a method 1300 for requesting a UAV-based agricultural service according to various aspects of the principles described above. Method 1300 can be performed by a server-based platform, such as platform 106 of FIG. 1. The server-based platform can include one or more servers, which can include enterprise and/or cloud-based servers, in communication with one or more networks. One or more of the following steps can be performed solely by the platform or can be performed in association with third-party services that have been integrated with the platform, such as using one or more APIs for accessing the third-party services.

At step 1302, an SMS message request for a UAV-based agricultural service is received from a user. The user could be, for example, a farmer or other agricultural stakeholder interested in receiving a UAV-based agricultural service. The service that the user desires to obtain could include one or more aerial surveillance based products, such as one or more of: mapping, such as orthomosaic maps for assessing land use and identifying demarcations, surveying, such as dense terrain and elevation models to strategize for planting or laying of irrigation networks, crop health analysis, such as NDVI reports to identify crop stress (disease, pest, irrigation deficiencies), stand assessment, such as machine learning-based counts of crop heads for yield estimation, 3D modeling, such as detailed topographic model for project development, stockpile volumetrics, such as measures of factory feedstock supply on-site. The service may include aerial surveillance, which may be provided by a UAV that has the imaging systems needed to acquire the imaging needed to perform the services.

The SMS message may be received from a mobile telephone, such as a non-smartphone mobile telephone. The SMS message may include any suitable content, including any suitable text, whether predefined or undefined. For example, a user may send a message that includes the text "Hello." Reception of the SMS message may initiate an SMS-based workflow intended to establish a UAV-based agricultural service work request.

At step 1304, in response to receiving the SMS message request, one or more SMS-based prompts are transmitted to the user. The prompts include predefined response options for defining the UAV-based agricultural service requested by the user. The prompts could include, for example, a request to select from among predefined geographical regions encompassing the location of the farm or other agricultural site, a request to select one or more different UAV-based products (e.g., mapping, surveying, etc.), and/or a request to select from among predefined acreage of the region to be surveilled.

At step 1306, a UAV-based agricultural service work request is generated based on responses from the user to the one or more SMS-based prompts that comprise selections of predefined responses. For example, a work request can be generated based on the user's responses that specifies the regional location for the work, the one or more surveillance based products requested, and/or a acreage range for the agricultural site.

At step 1308, an automated voice call is send to a plurality of UAV operators seeking acceptance of the UAV-based agricultural service work request. The UAV operators may be registered with the platform for providing UAV services, and the calls may be sent to phone numbers associated with the accounts of the respective operators. Calls may be sent only to those operators that provide services within a requested geographical region. In some embodiments, emails, SMS messages, or push notifications are sent to one or more UAV operators. However, calls may be preferable in order to ensure prompt acceptance of the work request.

A UAV operator that answers the automated voice call is provided with the option to accept or decline the UAV-based work request. If the UAV operator accepts the work request, a one-time password may be transmitted to the UAV operator in step 1310. The one-time password may be transmitted, for example, via an SMS message to the same number to which the automated voice call was made. Alternatively, the one-time password may be transmitted to a different device associated with the operator's account, to an email address associated with the operator's account, or via a push notification to the operator's phone or other device associated with the operator's account.

At step 1312, an access request is received from the accepting UAV operator comprising the one-time password. The UAV operator already is establish with the platform (i.e., has an account with the platform). In other words, the one-time password is not used to create a new account for the UAV operator. The access request may be received via a client device accessing the platform via an App-based or web-based interface. For example, the accepting operator may use a smartphone, tablet, desktop computer, or other edge device to access the platform and provide the one-time password to the platform. The platform may then authenticate the request based on the one-time password. The one-time password may be associated with a time limit such that authentication will fail if the time limit has expired. The one-time password may additionally or alternatively be associated with a device associated with the operator's account such that the authentication depends on the operators providing the one-time password via the registered device.

At step 1314, in accordance with a successful authentication based on the one-time password, the UAV-based agricultural service work request is associated with the already existing account of the accepting UAV operator on the platform. The UAV operator may then view the request via the platform to obtain information for completing the request. The information may include information associated with the requestor's responses to the automated prompts described above with respect to step 1304 and may also include contact information for the requestor. The operator may contact the requestor to obtain further information, such as the location of the agricultural site and agreement on timing to perform the UAV surveillance.

The operator may use the platform to create a flight plan, as discussed above. The operator may input location information into a flight planning system, which may be implemented by the platform or accessed via the platform, such as a location information, a polygon defining the bounds of the flight, start/stop points for the UAV, altitude, flight speed, and/or any other information useful for flight planning. A flight plan may be generated based on the information provided by the operator. The flight plan may be provided to the UAV, such as via the operator's smartphone, tablet, or other device. The flight plan may be downloaded to the UAV on site or prior to the operator arriving at the site with the UAV.

The UAV executes the flight plan and obtains surveillance data during the flight, such as white-light imaging, multispectral imaging, infrared imaging, or any other suitable sensor-derived data. According to various embodiments, the UAV may transmit flight-related data to the platform, such as over a cellular or satellite network and/or via a smartphone or tablet or other device of the operator. The platform may record the flight-related data for future review and/or may display the flight-related data to personnel for monitoring the flight.

The surveillance data may be uploaded to the platform. This may occur during the flight, after the flight, or both. The platform may include image processing for assembling and analyzing images captured by the UAV to generate the requested product (e.g., mapping, surveying, crop health analysis, etc.).

The completed product(s) may be provided to the request in any suitable fashion, including via a printed report. The requestor may additionally, or alternatively, access the product(s) via the platform, such as using a computing system at a local internet access point.

Figure 14:
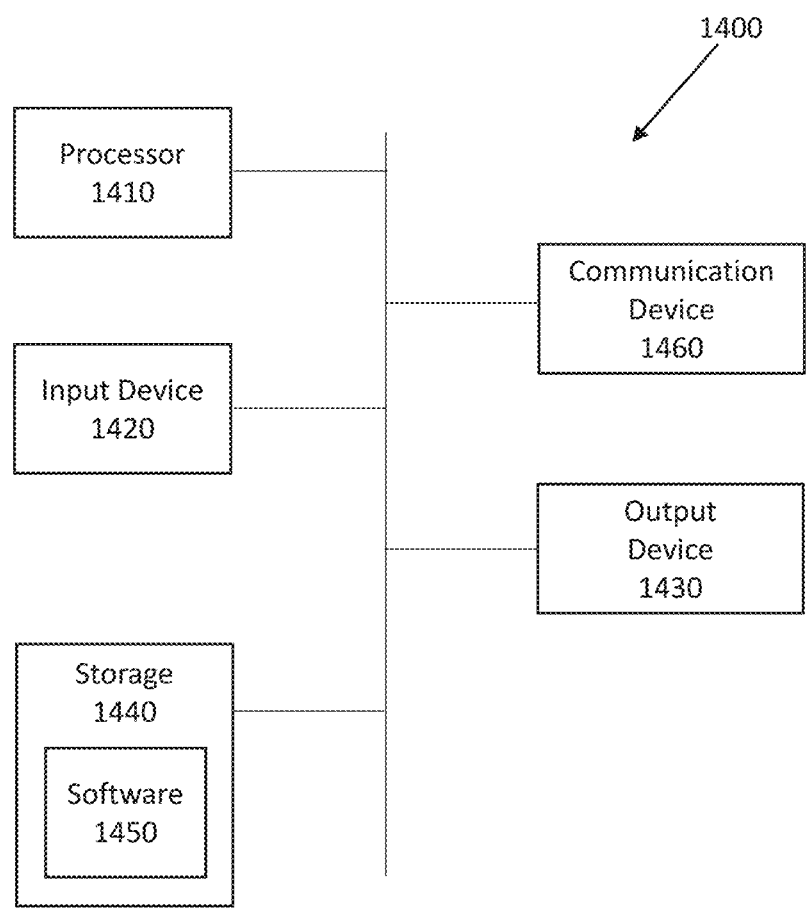
FIG. 14 is a functional block diagram of an exemplary computing system.

FIG. 14 illustrates an example of a computing system 1400, in accordance with some embodiments, that can be used for any computing system described above, including for implementing all or part of platform 106 of FIG. 1. System 1400 can be a computer connected to a network, including a local area network and/or a wide area network. As shown in FIG. 14, system 1400 can be any suitable type of processor-based system, such as a personal computer, workstation, server, handheld computing device (portable electronic device) such as a phone or tablet, or dedicated device. The system 1400 can include, for example, one or more of input device 1420, output device 1430, one or more processors 1410, storage 1440, and communication device 1460. Input device 1420 and output device 1430 can generally correspond to those described above and can either be connectable or integrated with the computer.

Input device 1420 can be any suitable device that provides input, such as a touch screen, keyboard or keypad, mouse, gesture recognition component of a virtual/augmented reality system, or voice-recognition device. Output device 1430 can be or include any suitable device that provides output, such as a display, touch screen, haptics device, virtual/augmented reality display, or speaker.

Storage 1440 can be any suitable device that provides storage, such as an electrical, magnetic, or optical memory including a RAM, cache, hard drive, removable storage disk, or other non-transitory computer readable medium. Communication device 1460 can include any suitable device capable of transmitting and receiving signals over a network, such as a network interface chip or device. The components of the computing system 1400 can be connected in any suitable manner, such as via a physical bus or wirelessly.

Processor(s) 1410 can be any suitable processor or combination of processors, including any of, or any combination of, a central processing unit (CPU), graphics processing unit (GPU), field programmable gate array (FPGA), and application-specific integrated circuit (ASIC). Software 1450, which can be stored in storage 1440 and executed by one or more processors 1410, can include, for example, the programming that embodies the functionality or portions of the functionality of the present disclosure (e.g., as embodied in the devices as described above). For example, software 1450 can include one or more programs for execution by one or more processor(s) 1410 for performing one or more of the steps of method 1300.

Software 1450 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1440, that can contain or store programming for use by or in connection with an instruction execution system, apparatus, or device.

Software 1450 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 1400 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 1400 can implement any operating system suitable for operating on the network. Software 1450 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for requesting an unmanned aerial vehicle (UAV)-based agricultural service, the method comprising, at a server-based platform:
   receiving from a user an SMS message request for a UAV-based agricultural service;
   in response to receiving the SMS message request, transmitting to the user one or more SMS-based prompts with predefined response options for defining the UAV-based agricultural service, wherein the predefined response options are associated with numbers and specify one or more geographical regions associated with the UAV-based agricultural service;
   receiving from the user a SMS message response comprising a selection of one or more of the numbers;
   in response to receiving the SMS message response, identifying the one or more geographical regions based on the selection of the one or more of the numbers;
   generating a UAV-based agricultural service work request based on the one or more geographical regions;
   transmitting automated voice calls to a plurality of UAV operators requesting acceptance of the UAV-based agricultural service work request;
   in response to receiving an acceptance from an accepting UAV operator during a voice call, transmitting a one-time password to the accepting UAV operator;
   receiving an access request from the accepting UAV operator comprising the one-time password, the UAV operator already having a pre-established account with the server-based platform; and
   in accordance with a successful authentication based on the one-time password, associating the UAV-based agricultural service work request with the pre-establish pre-established account associated with the accepting UAV operator.

2. The method of claim 1, further comprising receiving input from the UAV operator comprising information associated with the UAV-based agricultural service to be performed, and establishing a UAV flight plan based on the information.

3. The method of claim 2, further comprising transmitting the flight plan for controlling a UAV to obtain imaging for the UAV-based agricultural service.

4. The method of claim 3, further comprising receiving flight data generated by the UAV for monitoring completion of the UAV-based agricultural service.

5. The method of claim 2, wherein the information comprises a polygon defining an agricultural area to be imaged.

6. The method of claim 1, wherein the SMS message request is received from a nonsmartphone telephone.

7. The method of claim 1, wherein the one-time password is associated with a time limit such that the access request is rejected if received after expiration of the time limit.

8. The method of claim 1, wherein the UAV-based agricultural service comprises agricultural field imaging.

9. The method of claim 1, further comprising receiving imaging captured by the UAV, analyzing the imaging according to the UAV-based agricultural service, and storing results of the analysis of the imaging for providing to the user.

10. A server system for requesting an unmanned aerial vehicle (UAV)-based agricultural service, the system comprising one or more processors, memory, and one or more programs stored in the memory for execution by the one or more processors and comprising instructions for:
   receiving from a user an SMS message request for a UAV-based agricultural service;
   in response to receiving the SMS message request, transmitting to the user one or more SMS-based prompts with predefined response options for defining the UAV-based agricultural service, wherein the predefined response options are associated with numbers and specify one or more geographical regions associated with the UAV-based agricultural service;
   receiving from the user a SMS message response comprising a selection of one or more of the numbers;
   in response to receiving the SMS message response, identifying the one or more geographical regions based on the selection of the one or more of the numbers;
   generating a UAV-based agricultural service work request based on the one or more geographical regions;
   transmitting automated voice calls to a plurality of UAV operators requesting acceptance of the UAV-based agricultural service work request;
   in response to receiving an acceptance from an accepting UAV operator during a voice call, transmitting a one-time password to the accepting UAV operator;
   receiving an access request from the accepting UAV operator comprising the one-time password, the UAV operator already having a pre-established account with the server-based platform; and
   in accordance with a successful authentication based on the one-time password, associating the UAV-based agricultural service work request with the pre-establish pre-established account associated with the accepting UAV operator.

11. The system of claim 10, wherein the one or more programs further comprise instructions for receiving input from the UAV operator comprising information associated with the UAV-based agricultural service to be performed, and establishing a UAV flight plan based on the information.

12. The system of claim 11, wherein the one or more programs further comprise instructions for transmitting the flight plan for controlling a UAV to obtain imaging for the UAV-based agricultural service.

13. The system of claim 12, wherein the one or more programs further comprise instructions for receiving flight data generated by the UAV for monitoring completion of the UAV-based agricultural service.

14. The system of claim 11, wherein the information comprises a polygon defining an agricultural area to be imaged.

15. The system of claim 10, wherein the SMS message request is received from a non-smartphone telephone.

16. The system of claim 10, wherein the one-time password is associated with a time limit such that the access request is rejected if received after expiration of the time limit.

17. The system of claim 10, wherein the UAV-based agricultural service comprises agricultural field imaging.

18. The system of claim 10, wherein the one or more programs further comprise instructions for receiving imaging captured by the UAV, analyzing the imaging according to the UAV-based agricultural service, and storing results of the analysis of the imaging for providing to the user.

* * * * *